US011580965B1

(12) United States Patent
Sunkara et al.

(10) Patent No.: US 11,580,965 B1
(45) Date of Patent: Feb. 14, 2023

(54) MULTIMODAL BASED PUNCTUATION AND/OR CASING PREDICTION

(71) Applicant: Amazon Technologies, Inc., Seattle, WA (US)

(72) Inventors: Monica Lakshmi Sunkara, Seatle, WA (US); Srikanth Ronanki, Bellevue, WA (US); Dhanush Bekal Kannangola, Seattle, WA (US); Sravan Babu Bodapati, Redmond, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 16/938,783

(22) Filed: Jul. 24, 2020

(51) Int. Cl.
*G10L 15/19* (2013.01)
*G06N 3/049* (2023.01)
*G10L 15/26* (2006.01)
*G10L 15/06* (2013.01)

(52) U.S. Cl.
CPC .............. *G10L 15/19* (2013.01); *G06N 3/049* (2013.01); *G10L 15/26* (2013.01); *G10L 2015/0633* (2013.01)

(58) Field of Classification Search
None
See application file for complete search history.

(56) References Cited

U.S. PATENT DOCUMENTS

| | | | |
|---|---|---|---|
| 9,666,208 B1 * | 5/2017 | Rubin | G10L 21/12 |
| 10,366,158 B2 * | 7/2019 | Bellegarda | G10L 15/16 |
| 10,937,444 B1 * | 3/2021 | Suendermann-Oeft | G06N 3/0481 |
| 2006/0069562 A1 * | 3/2006 | Adams | G09B 5/00 704/E15.04 |

(Continued)

OTHER PUBLICATIONS

Augustyniak, Lukasz et al., "Punctuation Prediction in Spontaneous Conversations: Can We Mitigate ASR Errors with Retrofitted Word Embedding?"; arXiv:2004.05985v1, 2020, 6 pages.

(Continued)

*Primary Examiner* — Neeraj Sharma
(74) *Attorney, Agent, or Firm* — Nicholson De Vos Webster & Elliott, LLP

(57) ABSTRACT

Techniques for predicting punctuation and casing using multimodal fusion are described. An exemplary method includes processing generated text by: tokenizing the generated text into sub-words, and generating a sequence of lexical features for the sub-words using a pre-trained lexical encoder; processing audio of the audio by: generating a sequence of frame level acoustic embeddings using a pre-trained acoustic encoder on the audio, and generating task specific embeddings from the frame level acoustic embeddings; performing multimodal fusion of the sub-word level acoustic embeddings and the sequence of lexical features by: aligning the task specific embeddings to the sequence of lexical features, and combining the sequence of lexical features and aligned acoustic sequence; predicting punctuation and casing from the combined sequence of lexical (Continued)

features and aligned acoustic sequence; concatenating the sub-words of the text, and applying the predicted punctuation and casing; and outputting text having the predicted punctuation and casing.

20 Claims, 9 Drawing Sheets

(56) References Cited

U.S. PATENT DOCUMENTS

| | | | |
|---|---|---|---|
| 2011/0035219 A1* | 2/2011 | Kadirkamanathan | G10L 15/187 |
| | | | 707/769 |
| 2018/0268806 A1* | 9/2018 | Chun | G10L 13/027 |
| 2019/0122651 A1* | 4/2019 | Arik | G10L 13/027 |
| 2021/0110116 A1* | 4/2021 | Yoo | G06N 20/00 |
| 2021/0209315 A1* | 7/2021 | Jia | G06F 40/58 |
| 2022/0020355 A1* | 1/2022 | Ming | G06F 40/20 |

OTHER PUBLICATIONS

Beeferman, Doug et al., "Cyberpunc: a Lightweight Punctuation Annotation System for Speech"; IEEE International Conference on Acoustics, Speech and Signal Processing (ICASSP), vol. 2, 1998, 4 pages.

Chan, William et al., "Listen, Attend and Spell"; arXiv: 1508.01211v2, 2015, 16 pages.

Chen, Qian et al., "BERT for Joint Intent Classification and Slot Filing"; arXiv:1902.10909v1,2019, 6 pages.

Christensen, Heidi et al., "Punctuation Annotation Using Statistical Prosody Models"; ISCA Tutorial and Research Workshop (ITRW) on Prosody in Speech Recognition and Understanding, 2001, 7 pages.

Cieri, Christopher et al., "The Fisher Corpus: a Resource for the Next Generations of Speech-to-Text"; LREC, vol. 4, 2004, 3 pages.

Devlin, Jacob et al., "BERT: Pre-Training of Deep Bidirectional Transformers for Language Understanding" arXiv: 1810.048052, 2019, 16 pages.

Dong, Linhao et al., "Speech-Transformer: a No-Recurrence Sequence-to-Sequence Model for Speech Recognition" 2018 IEEE International Conference on Acoustics, Speech and Signal Processing (ICASSP), 2018, 5 pages.

Ghahremani, Pegah et al., "A Pitch Extraction Algorithm Tuned for Automatic Speech Recognition"; 2014 IEEE International Conference on Acoustics, Speech and Signal Processing (ICASSP), 2014, 5 pages.

Gotoh, Yoshihiko et al., "Sentence Boundary Detection in Broadcast Speech Transcripts"; Proceedings of the International Speech Communication Association (ISCA) Workshop, 2000, 8 pages.

Gravano, Agustin et al., "Restoring Punctuation and Capitalization in Transcribed Speech"; 2009 IEEE International Conference on Acoustics, Speech and Signal Processing (ICASSP), 2009, 4 pages.

Huang, Jing et al., "Maximum Entropy Model for Punctuation Annotation From Speech"; 7th International Conference on Spoken Language Processing, 2002, 4 pages.

Klejch, Ondrej et al., "Punctuated Transcription of Multi-Genre Broadcasts Using Acoustic and Lexical Approaches" IEEE Spoken Language Technology Workshop (SLT), 2016, 8 pages.

Klejch, Ondrej et al., "Sequence-to-Sequence Models for Punctuated Transcription Combining Lexical and Acoustic Features"; IEEE International Conference on Acoustics, Speech and Signal Processing (ICASSP), 2017, 5 pages.

Lu, Wei et al., "Better Punctuation Prediction with Dynamic Conditional Random Fields"; Proceedings of the 2010 Conference on Empirical Methods in Natural Language Processing, 2010, 10 pages.

Moro, Anna et al., "A Prosody Inspired RNN Approach for Punctuation of Machine Produced Speech Transcripts to Improve Human Readability"; 8th IEEE International Conference on Cognitive Infocommunications (CogInfoCom), 2017, 6 pages.

Nguyen, Binh et al., "Fast and Accurate Capitalization and Punctuation for Automatic Speech Recognition Using Transformer and Chunk Merging"; arXiv: 1908.02404v1, 2019, 5 pages.

Oktem, Alp et al., "Attentional Parallel RNNs for Generating Punctuation in Transcribed Speech"; International Conference on Statistical Language and Speech Processing, 2017, 13 pages.

Pahuja, Vardaan et al., "Joint Learning of Correlated Sequence Labeling Tasks Using Bidirectional Recurrent Neural Networks"; arXiv.1703.04650v3, 2017, 5 pages.

Povey, Daniel et al., "The Kaldi Speech Recognition Toolkit"; IEEE 2011 Workshop on Automatic Speech Recognition and Understanding, 2011, 4 pages.

Schneider, Steffen et al., "wav2vec: Unsupervised Pre-Training for Speech Recognition"; arXiv: 1904.05862v4, 2019, 9 pages.

Schuster, Mike et al., "Japanese and Korean Voice Search"; 2012 IEEE International Conference on Acoustics, Speech and Signal Processing (ICASSP), 2012, 4 pages.

Skerry-Ryan, RJ et al., "Towards End-to-End Prosody Transfer for Expressive Speech Synthesis with Tacotron" arXiv. 1803.090471, 2018, 11 pages.

Stolcke, Andreas et al., "Automatic Detection of Sentence Boundaries and Disfluencies Based on Recognized Words" Fifth International Conference on Spoken Language Processing, 1999, 5 pages.

Sunkara, Monica et al., "Robust Prediction of Punctuation and Truecasing for Medical ASR"; Proceedings of the First Workshop on Natural Language Processing for Medical Conversations, 2020, 11 pages.

Tilk, Ottokar et al., "Bidirectional Recurrent Neural Network with Attention Mechanism for Punctuation Restoration" Interspeech, 2016, 6 pages.

Tilk, Ottokar et al., "LSTM for Punctuation Restoration in Speech Transcripts"; Sixteenth Annual Conference of the International Speech Communication Association, 2015, 6 pages.

Ueffing, Nicola et al., "Improved Models for Automatic Punctuation Prediction for Spoken and Written Text" Interspeech, 2013, 5 pages.

Vaswani, Ashish et al., "Attention is All You Need"; 31st Conference on Neural Information Processing Systems (NIPS), 2017, 11 pages.

Yang, Wei et al., "End-to-End Open-Domain Question Answering with BERTserini"; arXiv:1902.01718v2, 2019, 6 pages.

Yi, Jiangyan et al., "Self-Attention Based Model for Punctuation Prediction Using Word and Speech Embeddings" IEEE International Conference on Acoustics, Speech and Signal Processing (ICASSP), 2019, 5 pages.

Zelasko, Piotr et al., "Punctuation Prediction Model for Conversational Speech"; arXiv:1807.00543v1, 2018, 6 pages.

\* cited by examiner

MULTIMODAL BASED PUNCTUATION AND/OR CASING PREDICTION

BACKGROUND

The output text generated from automatic speech recognition (ASR) systems is typically devoid of punctuation and sentence formatting. Lack of sentence segmentation and punctuation makes it difficult to comprehend the ASR output. For example, consider the two sentences: "Let's eat Grandma" vs. "Let's eat, Grandma!". Punctuation restoration not only helps understand the context of the text, but also greatly improves the readability. Punctuated text also often helps in boosting the performance of several downstream natural language understanding (NLU) tasks.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for predicting punctuation and casing for text. According to some embodiments, sub-words extracted from text and sub-word acoustical information from audio from which the text is extracted are aligned and combined (multimodal fusion) to provide input into punctuation and/or casing layers to predict the punctuation and casing for the text.

There is a plethora of work done in punctuation prediction over the past few decades. While some early methods of punctuation prediction used finite state or hidden Markov models, some other techniques have investigated probabilistic models like language modeling, conditional random fields (CRFs), and maximum entropy models. As neural networks gained popularity, several approaches have been proposed based on sequence labeling and neural machine translation. These models widely used convolutional neural networks (CNNs) and LSTM based architectures. More recently, attention and transformer-based architectures which have been successfully applied to a wide variety of tasks, have shown to perform well for punctuation prediction.

Although it is a well explored problem in the literature, most of these improvements do not directly translate to all domains. In particular, punctuation prediction for conversational speech is not very well explored. Also, a number of approaches have been proposed exploiting the use of acoustic features in addition to lexical features for punctuation task, but they are rather limited and do not clearly address the gap in performance with ASR outputs.

Embodiments detailed herein utilize a multimodal (text and audio) semi-supervised deep learning approach for punctuation prediction in conversational speech by leveraging pre-trained lexical and acoustic encoders. In particular, a multimodal fusion of lexical and acoustic embeddings for punctuation and/or casing prediction in conversational speech. Specifically, we investigate the benefits of using lexical and acoustic encoders that are pre-trained on large amounts of unpaired text and audio data using unsupervised learning. The key idea is to learn contextual representations through unsupervised training where substantial amounts of unlabeled data is available and then improve the performance on a downstream task like punctuation, for which the amount of data is limited, by leveraging learned representations. For multimodal fusion, in some embodiments, an attention mechanism is used to automatically learn the alignment of word level lexical features and frame level acoustic features in the absence of explicit forced alignments.

Figure 1:
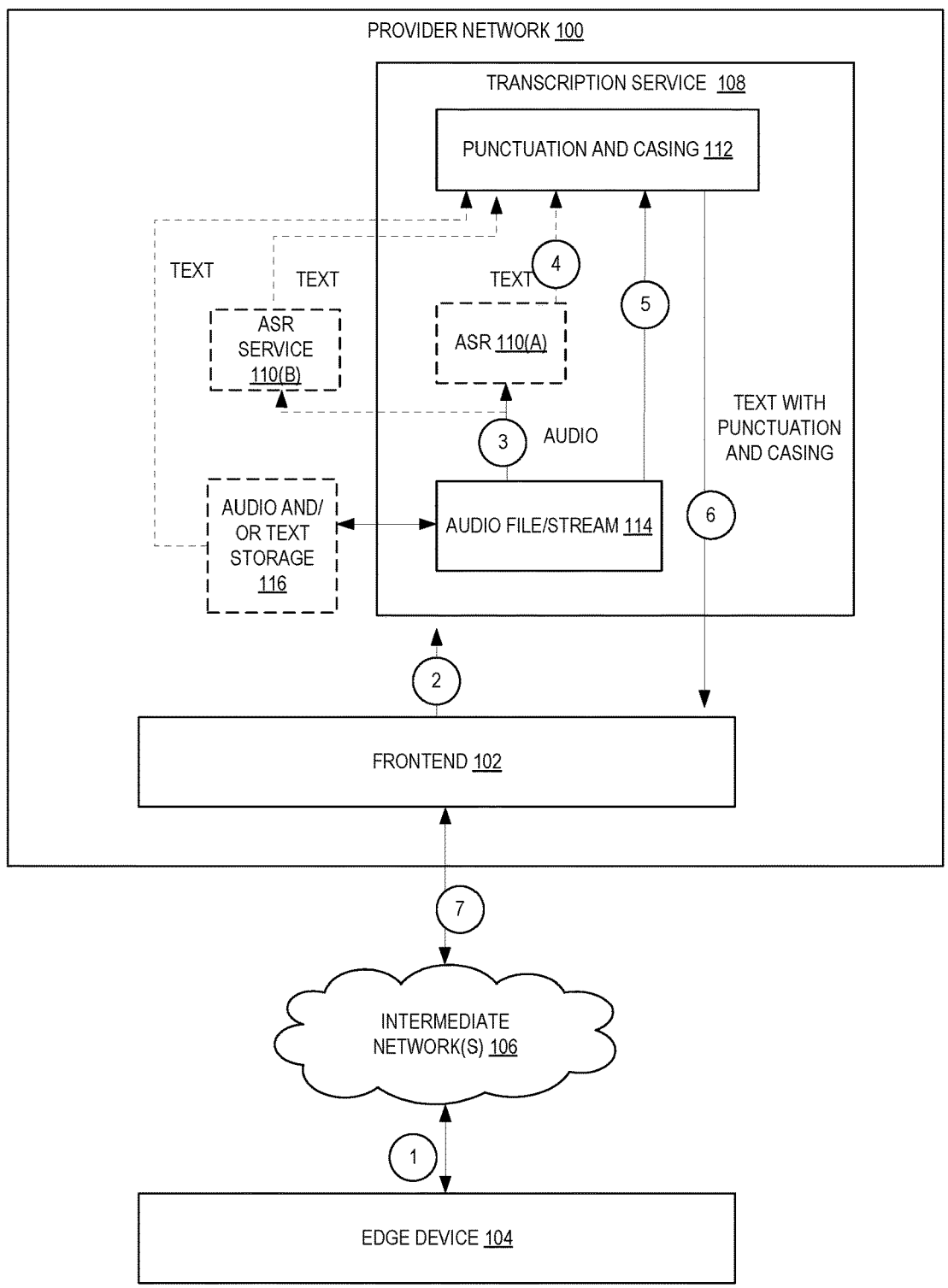
FIG. 1 illustrates embodiments of a system including a transcription service that can generate punctuation and casing for text.

FIG. 1 illustrates embodiments of a system including a transcription service that can generate punctuation and casing for text. The transcription service 108 of a provider network 100 takes in at least an audio file or stream 114 and may also take in text representing speech in the audio file or stream 114 and generates punctuation and casing for the text representing speech. In some embodiments, the transcription service 108 includes an ASR module 110(A) or calls to an ASR service 110(B) to generate text from the audio file or stream 114. Any number of ASR techniques may be used, including, but not limited to: hidden Markov models, dynamic time warping, neural networks (e.g., long short-term memory (LSTM), other recurrent neural networks (RNNs), time delay neural networks (TDNNs), deep neural networks, etc. In some embodiments, audio and/or text storage 116 stores one or more of an audio file and/or text from an audio file.

The punctuation and casing module 112 uses a multimodal semi-supervised learning architecture for punctuation and/or casing prediction. In particular, the prediction task may be considered a sequence labeling problem where punctuation and casing module 112 outputs a sequence of punctuation labels given text and corresponding audio. As will be detailed in a subsequent figure, the architecture of the punctuation and casing module 112 typically contains three main components: an acoustic encoder, a lexical encoder, and a fusion block to combine the outputs from both of the encoders. This fused output is evaluated for punctuation and/or casing and a resultant text (with punctuation and/or casing) is returned to, for example, the requester, or stored.

The transcription service 108 is invoked upon the receipt of a request to at least perform punctuation and/or casing predicting. The request may include one or more of: a location of the audio file (if not streaming), a pointer to a stream for audio stream (if streaming), an indication of if ASR is to performed (this indication may also include information about the audio such as a language, etc.), text to evaluate for punctuation and/or casing, an indication of the language of the text, a location to store the resultant text with punctuation and/or casing, an indication of the format of the audio file or stream, an indication of a sampling frequency of the audio, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Circles with numbers in them indicate exemplary actions of a flow for using the transcription service 108. At circle 1, an edge device 104 (e.g., a computer communicating with the provider network 100, transmits a request to the provider network for punctuation and/or casing to be predicted for given audio. Note that the edge device 104 does not need to be the device the generates the audio, however, in some embodiments, the edge device 104 (such as a smartphone, laptop, desktop, tablet, etc.) generates the audio through a recording and/or broadcasting program. The audio may be in a compressed form (either lossy or lossless) or in a more uncompressed form (such as a typical WAVE/WAV file or raw file).

At circle 2, a frontend 102 of the provider network 100 forwards the request (possibly in a modified format) to the transcription service 108. In this example, the request is to provide text with punctuation and casing from an audio file. Note that the audio file is shown within the transcription service, but would normally be stored in a data store accessible to, or within, the provider network 100. For this request there is no text for the audio file available.

The audio file is provided to the ASR module 110(A) at circle 3. The ASR module 110(A) generates text for the audio file representing speech in the audio file and provides that text at circle 4 to the punctuation and casing module 112. The audio file itself is also provided to the punctuation and casing module 112 at circle 5.

The punctuation and casing module 112 predicts punctuation and casing for the text based at least in part on the audio of the audio file, and outputs the prediction at circle 6. Note the output is therefore the text, but punctuated and cased. More details of this process are described later.

At circle 7, the punctuated and cased text is provided back to the edge device 104.

Figure 2:
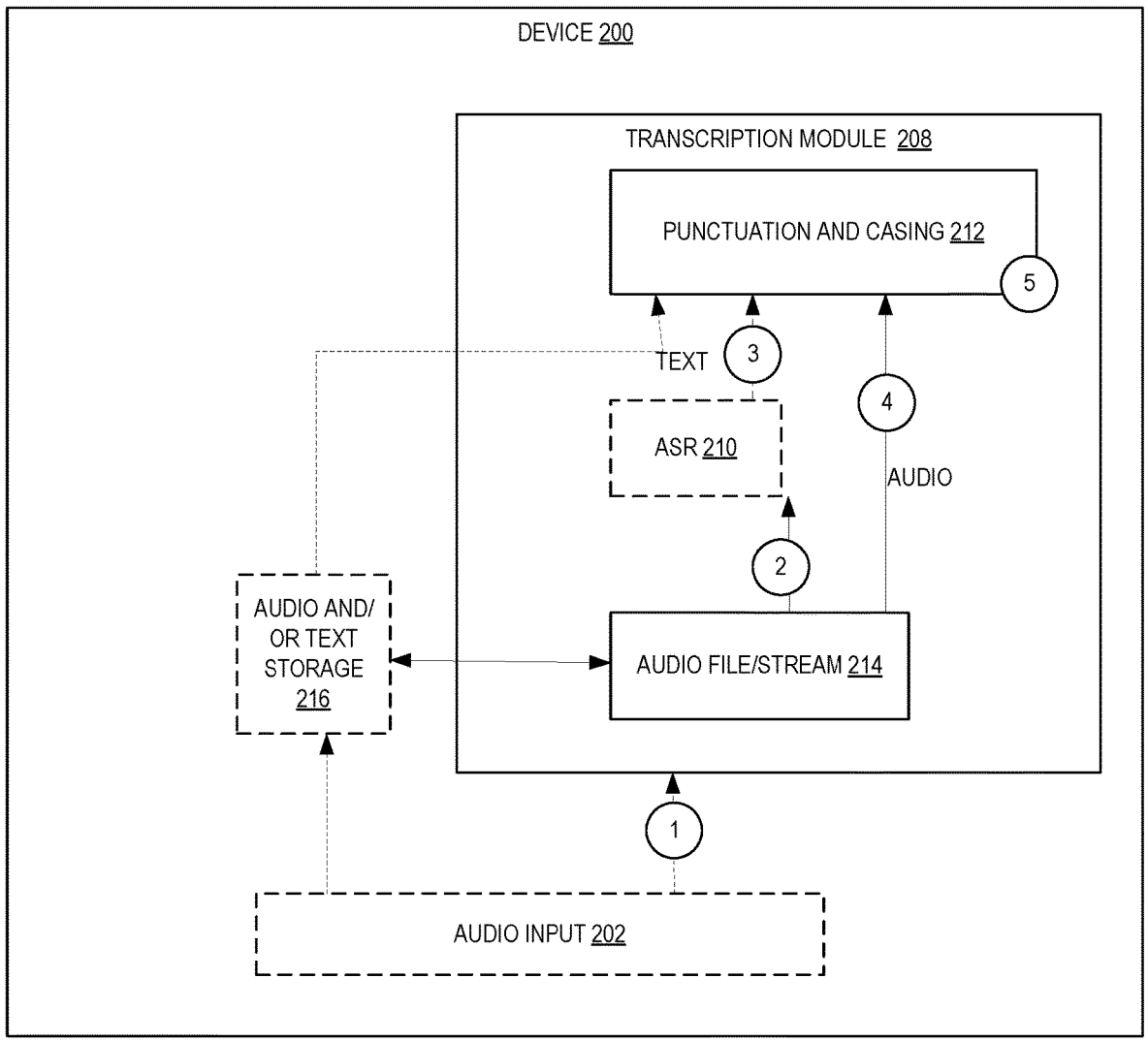
FIG. 2 illustrates embodiments of a device including a transcription module that can generate punctuation and casing for text.

FIG. 2 illustrates embodiments of a device including a transcription module that can generate punctuation and casing for text. The transcription module 208 of the device 200 takes in at least an audio file or stream 214 and may also take in text representing speech in the audio file or stream 214 (which may come from audio input 202 such as a microphone) and generates punctuation and casing for the text representing speech. In some embodiments, the transcription module 208 includes an ASR module 110 to generate text from the audio file or stream 214. Any number of ASR techniques may be used, including, but not limited to: hidden Markov models, dynamic time warping, neural networks (e.g., long short-term memory (LSTM), other recurrent neural networks (RNNs), time delay neural networks (TDNNs), deep neural networks, etc. In some embodiments, audio and/or text storage 216 stores one or more of an audio file and/or text from an audio file. T The punctuation and casing module 212 uses a multi-modal semi-supervised learning architecture for punctuation and/or casing prediction. In particular, the prediction task may be considered a sequence labeling problem where punctuation and casing module 212 outputs a sequence of punctuation labels given text and corresponding audio. As will be detailed in a subsequent figure, the architecture of the punctuation and casing module 212 typically contains three main components: an acoustic encoder, a lexical encoder, and a fusion block to combine the outputs from both of the encoders. This fused output is evaluated for punctuation and/or casing and a resultant text (with punctuation and/or casing) is returned to, for example, the requester, or stored.

The transcription module 208 is invoked upon the receipt of a request to at least perform punctuation and/or casing predicting. The request may include one or more of: a location of the audio file (if not streaming), a pointer to a stream for audio stream (if streaming), an indication of if ASR is to performed (this indication may also include information about the audio such as a language, etc.), text to evaluate for punctuation and/or casing, an indication of the language of the text, a location to store the resultant text with punctuation and/or casing, an indication of the format of the audio file or stream, etc.

Circles with numbers in them indicate exemplary actions of a flow for using the transcription module 208. At circle 1, the audio input 202 provides an audio file to the transcription module 208. This is input is typically due to a request from a program to execute the transcription module 208. The audio may be in a compressed form (either lossy or lossless) or in a more uncompressed form (such as a typical WAVE/WAV file or raw file).

The audio file is provided to the ASR module 210 at circle 3. The ASR module 210 generates text for the audio file representing speech in the audio file and provides that text at circle 3 to the punctuation and casing module 212. The audio file itself is also provided to the punctuation and casing module 212 at circle 4.

The punctuation and casing module 112 predicts punctuation and casing for the text based at least in part on the audio of the audio file, and outputs the prediction at circle 5. Note the output is therefore the text, but now punctuated and cased. More details of this process are described later.

Figure 3:
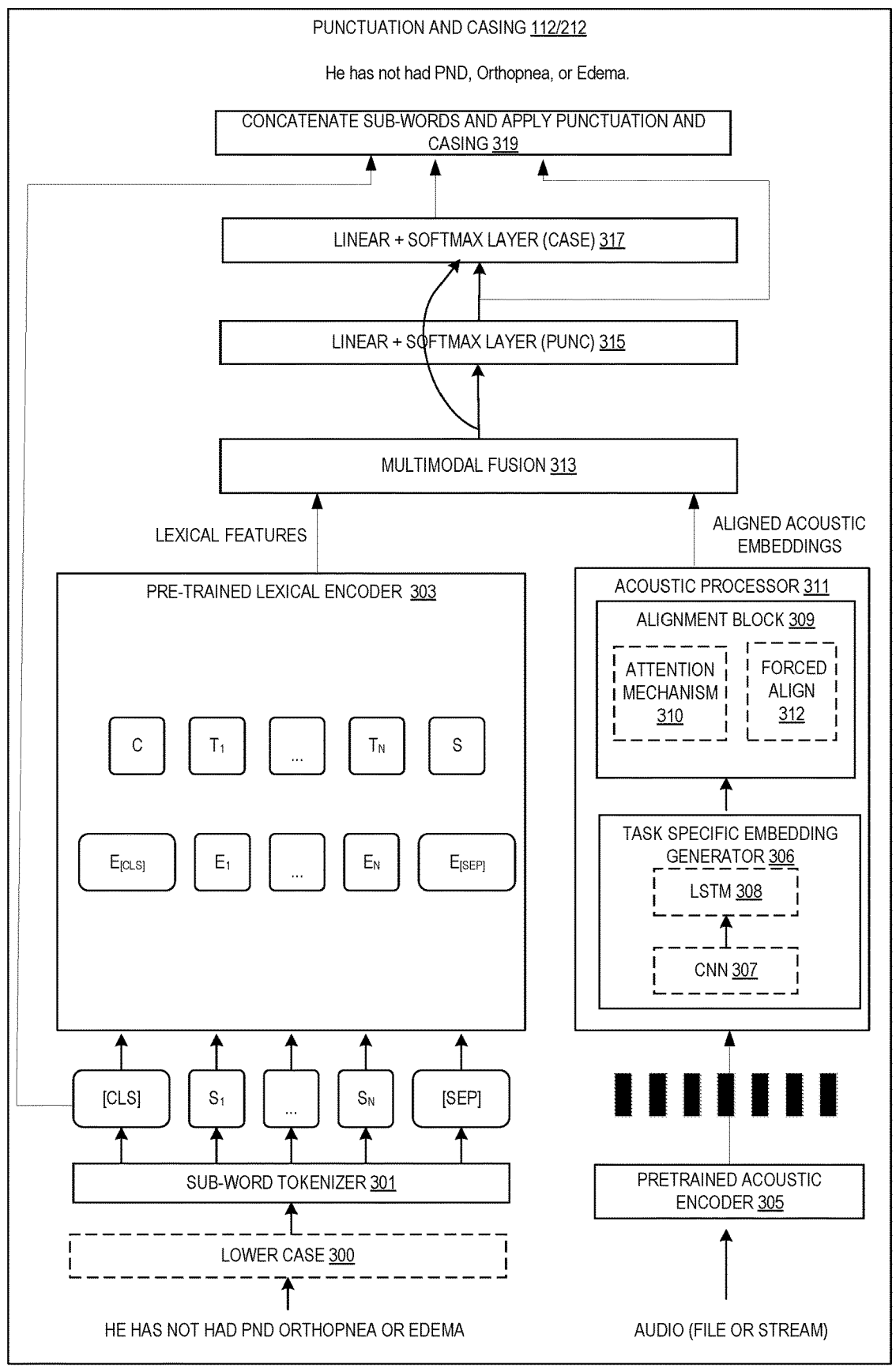
FIG. 3 illustrates embodiments of the punctuation and casing module aspect of a transcription service or transcription module.

FIG. 3 illustrates embodiments of the punctuation and casing module 112/212 aspect of a transcription service 108 or transcription module 208. Given a sequence of input words, the punctuation and casing module 112/212 extracts sub-words using a wordpiece tokenizer 301. In this illustration, the tokenized sub-words are in a format suitable for a bidirectional encoder representations from transformers (BERT) model, however, suitable model may be used. In some embodiments, before tokenizing, the text is first made to be in lower case using a lower case module 300.

The resulting sub-words are fed as input to a pretrained lexical encoder 303 which outputs a sequence of lexical features $H^l = (h_1^l, h_2^l, \ldots, h_n^l)$ at its final layer to a multimodal fusion block 313. The pretrained lexical encoder 303 is pretrained on a large unlabeled text corpus for learning rich contextual representations. In some embodiments, the pretrained encoder is truncated for inference.

A pretrained acoustic encoder 305 takes in an audio signal as an input and outputs a sequence of frame level acoustic embeddings. The acoustic encoder 305 is pretrained on a large unlabeled audio data with the objective to predict future samples from a given signal context. After pretraining, the parameters of the acoustic encoder 305 are frozen (not changed). Note that in some embodiments, prosodic features like fundamental frequency and energy can be determined and averaged across each word using other signal processing and concatenated with the sequence of frame level acoustic embeddings prior to serve as input of the acoustic processor 311. Pitch and melspec may also be concatenated.

The generated frame level acoustic embeddings (which may be concatenated with additional information as noted above) are then passed through an acoustic processor 311 to produce sub-word level acoustic outputs that are aligned (or to be aligned) with the lexical features. The acoustic processor 311 includes a task specific embedding generator 306 which generates task specific embeddings $\tilde{H}^a = (\tilde{h}_1^a, \tilde{h}_2^a, \ldots, \tilde{h}_T^a)$. which can then be aligned. In some embodiments, the task specific embedding generator 306 comprises a CNN 307 followed by a unidirectional LSTM layer 308 to learn the task specific embeddings. In other embodiments, some combination of CNN(s), bidirectional LSTM (BiLSTM), and/or self-attention comprise the task specific embedding generator 306.

An alignment block 309 aligns the task specific embeddings to the lexical features to form aligned acoustic embeddings. The multimodal fusion block 313 combines the output of the acoustic processor 311 (which has been aligned to the lexical features) and pre-trained lexical encoder 303. In some embodiments, combination is a concatenation of last layer representations of pretrained lexical encoder 303 with outputs from acoustic processor 311.

That that combination (e.g., concatenation) is used to predict punctuation using punctuation block 315 and case block 317. In some embodiments, for the punctuation block 315, the combined (concatenated) lexical and acoustic features are fed to a linear layer with softmax activation. The softmax output for punctuation is $\hat{p}_i = \text{softmax}(W^k(h_i^l \oplus h_i^a) + b^k)$. The punctuation output is combined with the combined (concatenated) lexical and acoustic features and fed to the case block 317 which comprises, in some embodiments, a linear layer with softmax activation. The softmax output for casing is $\hat{c}_i = \text{softmax}(W^l(\hat{p}_i \oplus h_i^l \oplus h_i^a) + b^l)$. Note that $W^k$ and $b^k$ denote weights and bias of the punctuation linear output.

The sub-words of the original text are concatenated and the predicted punctuation and casing are applied using module 319.

Unfortunately, since lexical and acoustic features differ in sequence length, it is not straightforward to concatenate them and some processing before this combining needs to be done. Embodiments of at least two different approaches for aligning an acoustic feature sequence (the task specific embeddings) with a lexical sequence using the alignment block 309 are described below to generate an aligned acoustic sequence $H^a = (h_1^a, h_2^a, \ldots, h_n^a)$. Regardless of which alignment approach is used, the resulting aligned acoustic hidden vector is combined with lexical encoder output.

In some embodiments, forced alignment is utilized. Force alignment mechanism 312 uses cumulative word durations (provided by the ASR) to choose the respective word-level features from LSTM 308 state outputs. As such, force-aligned word durations are used to extract word-level LSTM state outputs and extend the same to sub-words within each word. Note that force-aligned durations are used during training and word-level timestamps are used at inference time to form the sub-word level acoustic output.

Figure 4:
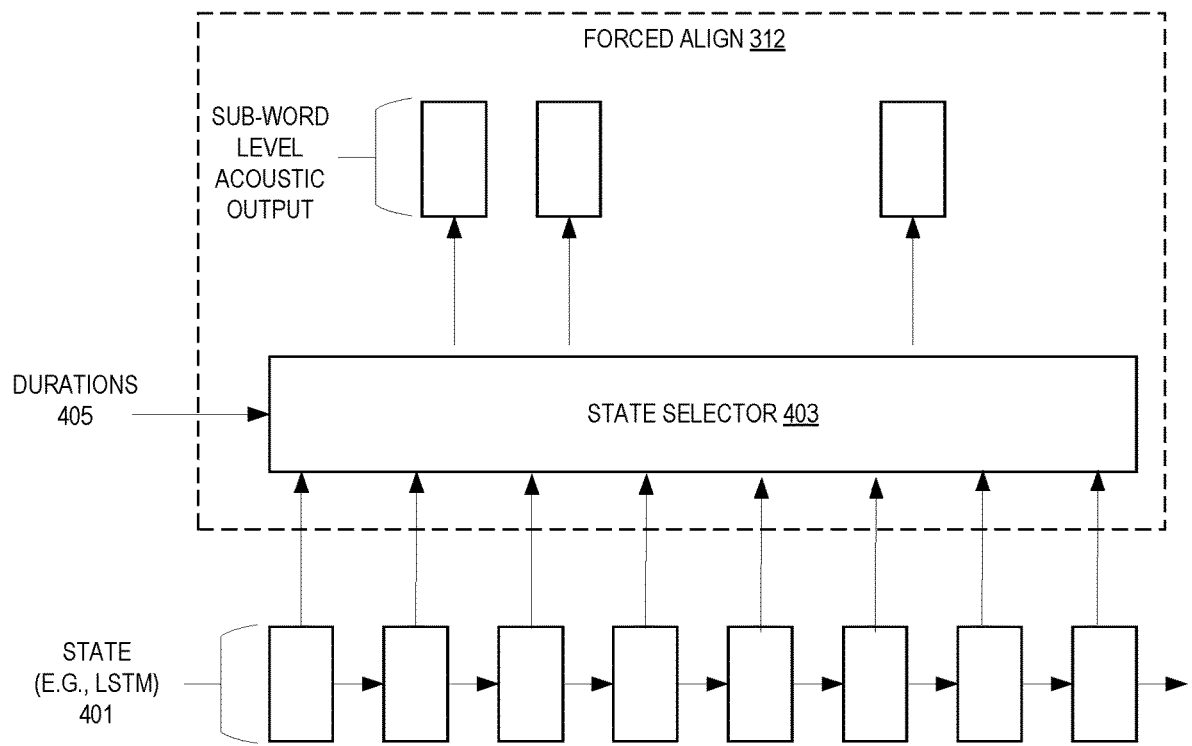
FIG. 4 illustrates embodiments of forced alignment.

FIG. 4 illustrates embodiments of forced alignment. In this example, the state of an LSTM 401 is provided to a state selector 403. As noted above, cumulative work durations 405 serve as the selector and the selected state becomes the sub-word level acoustic output.

In some embodiments, an attention-based alignment mechanism 310 is used. The use of force-aligned durations may limit the acoustic context to a limited number of frames. For at least this reason, an attention mechanism 310 (for example one that uses scaled dot-product attention) may be used to find the alignment between acoustic feature sequence with a sub-word.

Figure 5:
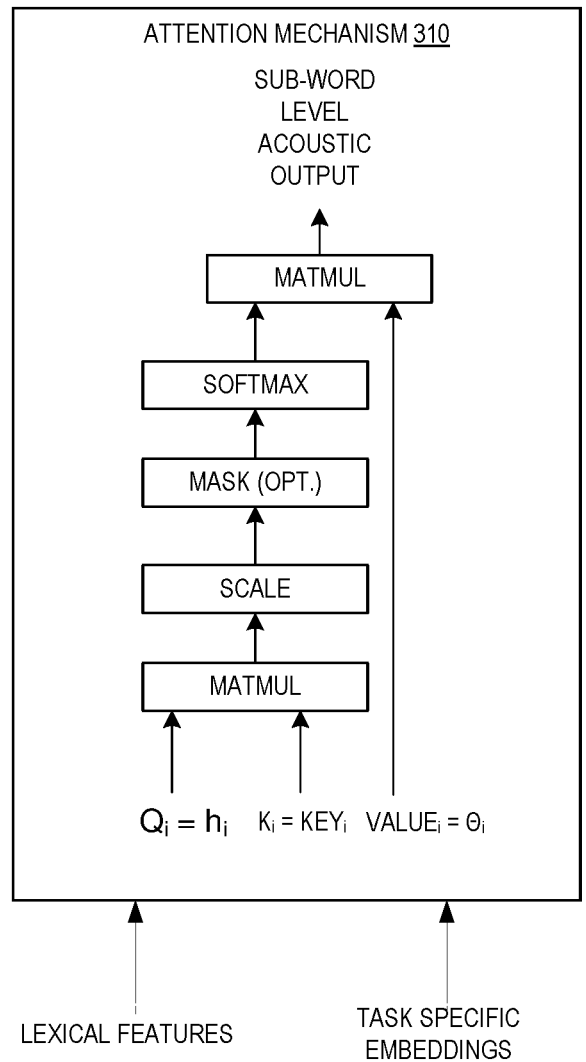
FIG. 5 illustrates embodiments of the attention mechanism.

FIG. 5 illustrates embodiments of the attention mechanism 310. This example of attention uses a "Scaled Dot-Product Attention." In particular, this attention mechanism takes in the lexical features of the pre-trained lexical encoder 303 and task specific embeddings generated by the task specific embeddings generator 306.

This example of attention uses a matrix multiplication performed on a query Q and key κ. The output of that multiplication is scaled (and optionally masked) before being input into a softmax function. A final matrix multiplication of a value and the softmax output gives the attention value according to the formula below. Attention $$\text{Attention}(Q, \kappa, \vartheta) = \text{softmax}\left(\frac{Q\kappa^T}{\sqrt{a_\kappa}}\right)\vartheta$$

The key κ and value ϑ are obtained, e.g., from LSTM state outputs of the task specific embedding generator 306 and $d_\kappa$ is the dimension of the keys. In particular, the key κ is obtained by using a projection layer whose weight matrix is $W^\kappa$:

$$\kappa_i^a = f(W^\kappa, h_i^a)$$

Note the attention weight is computed according to the similarity between the query $h_i^l$ (from the lexical features) and each key $\kappa_i^a$ and a weighted sum of the values is then obtained using the attention weight as $h_i^{\tilde{a}} = \text{Attention}(h_i^l, \kappa_i^a, h_i^a)$.

Figure 6:
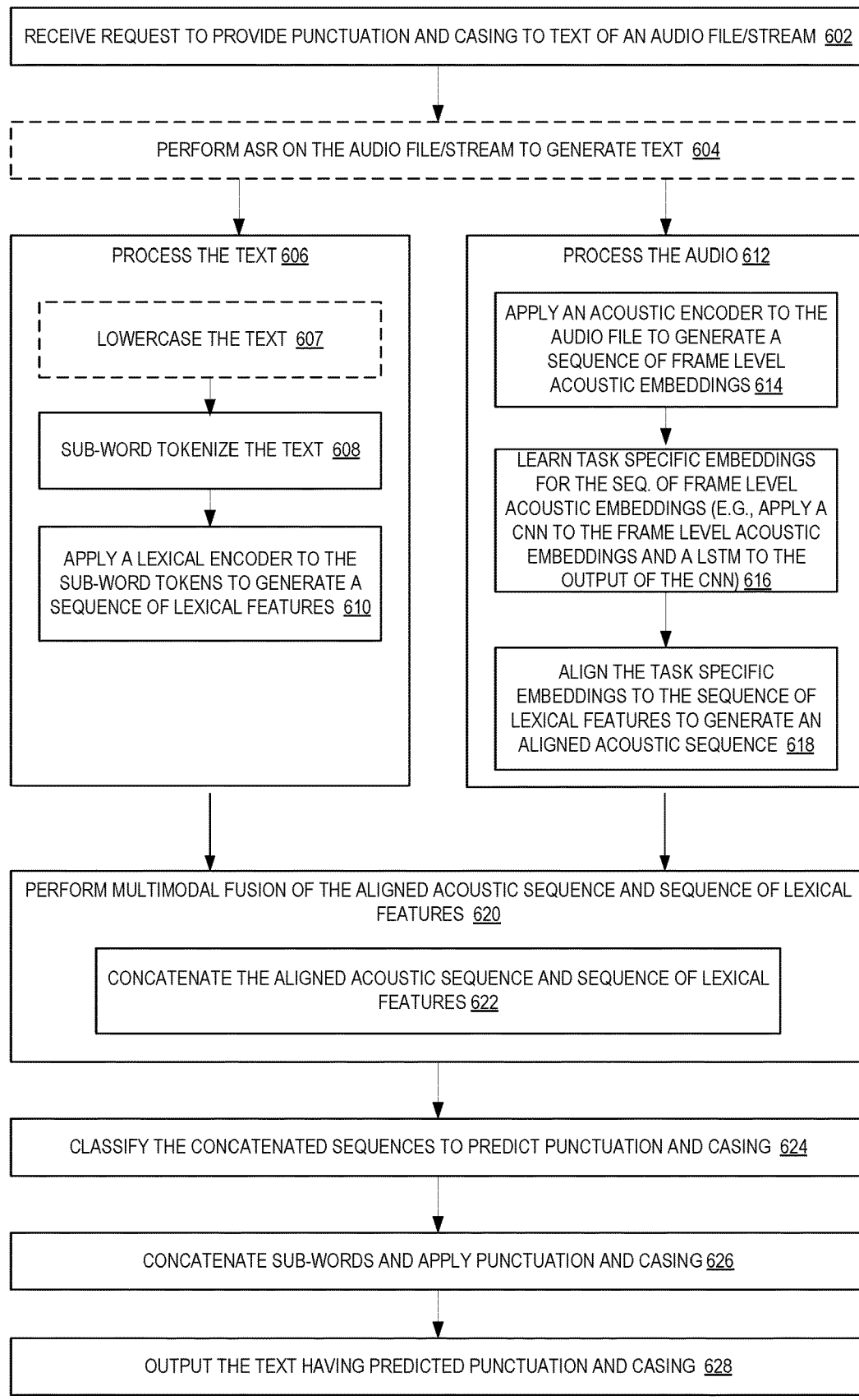
FIG. 6 is a flow diagram illustrating operations of a method for predicting punctuation and/or casing according to some embodiments.

FIG. 6 is a flow diagram illustrating operations of a method for predicting punctuation and/or casing according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the transcription module 208 or transcription service 108 of the other figures.

A request to provide punctuation and casing to text of an audio file is received at 602. Examples of such requests have been detailed above.

In some embodiments, ASR is performed on the audio file or stream to generate text to be punctuated and/or cased at 604. Note that in other embodiments, the text is provided.

The text is processed at 606. This processing may include one or more sub-acts. In some embodiments, the text is lowercased at 607. At 608, the text is sub-word tokenized. This tokenization puts the text into a form that a lexical encoder expects. The lexical encoder is applied to the sub-word tokens to generate a sequence of lexical features at 610.

At 612, the audio file or stream is processed. This processing may include one or more sub-acts. An acoustic encoder is applied to the audio file or stream to generate a sequence of frame level acoustic embeddings at 614. In some embodiments, prosodic information is also input to the acoustic encoder.

Task specific embeddings (e.g., sub-word level acoustic output) for the sequence of frame level acoustic embeddings are learned at 616. As noted above, this may be performed by applying a CNN to the frame level acoustic embeddings and a LSTM to the output of the CNN.

Multimodal fusion of the processed audio file/stream (task specific embeddings in the form of sub-word level acoustic output) and text (sequence of lexical features) at 618. The task specific embeddings are aligned to the sequence of lexical features to generate an aligned acoustic sequence at 620. Note that this may be considered a part of the processing of the audio file/stream. As detailed above, this alignment may be force or attention based.

The aligned acoustic sequence and sequence of lexical features are combined at 622. The combined sequences are classified to predict punctuation and casing at 624. The sub-words of the text are concatenated, and the predicted punctuation and casing applied to the concatenated text at 626. The resultant text having predicted punctuation and/or casing is output at 528.6

Figure 7:
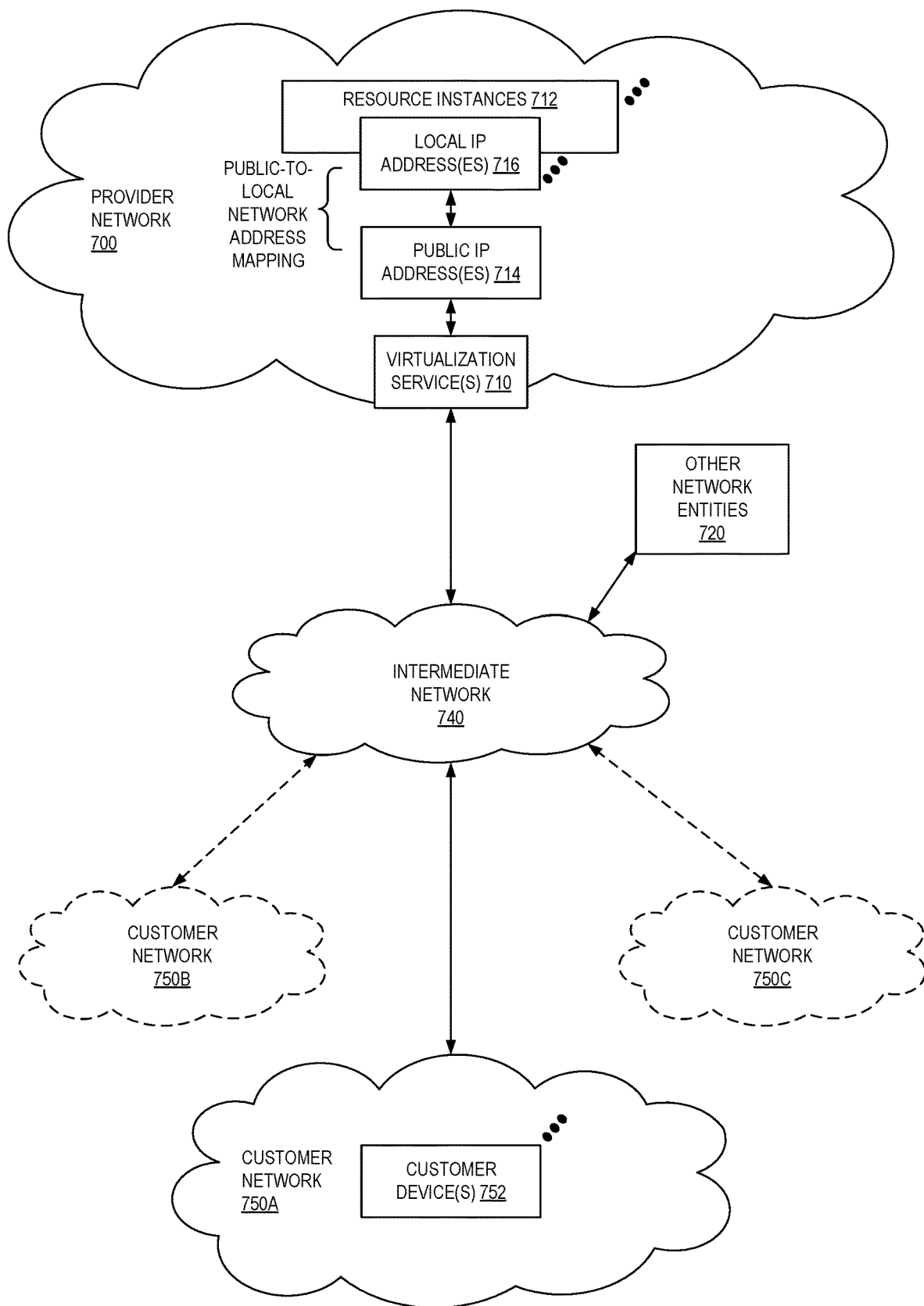
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
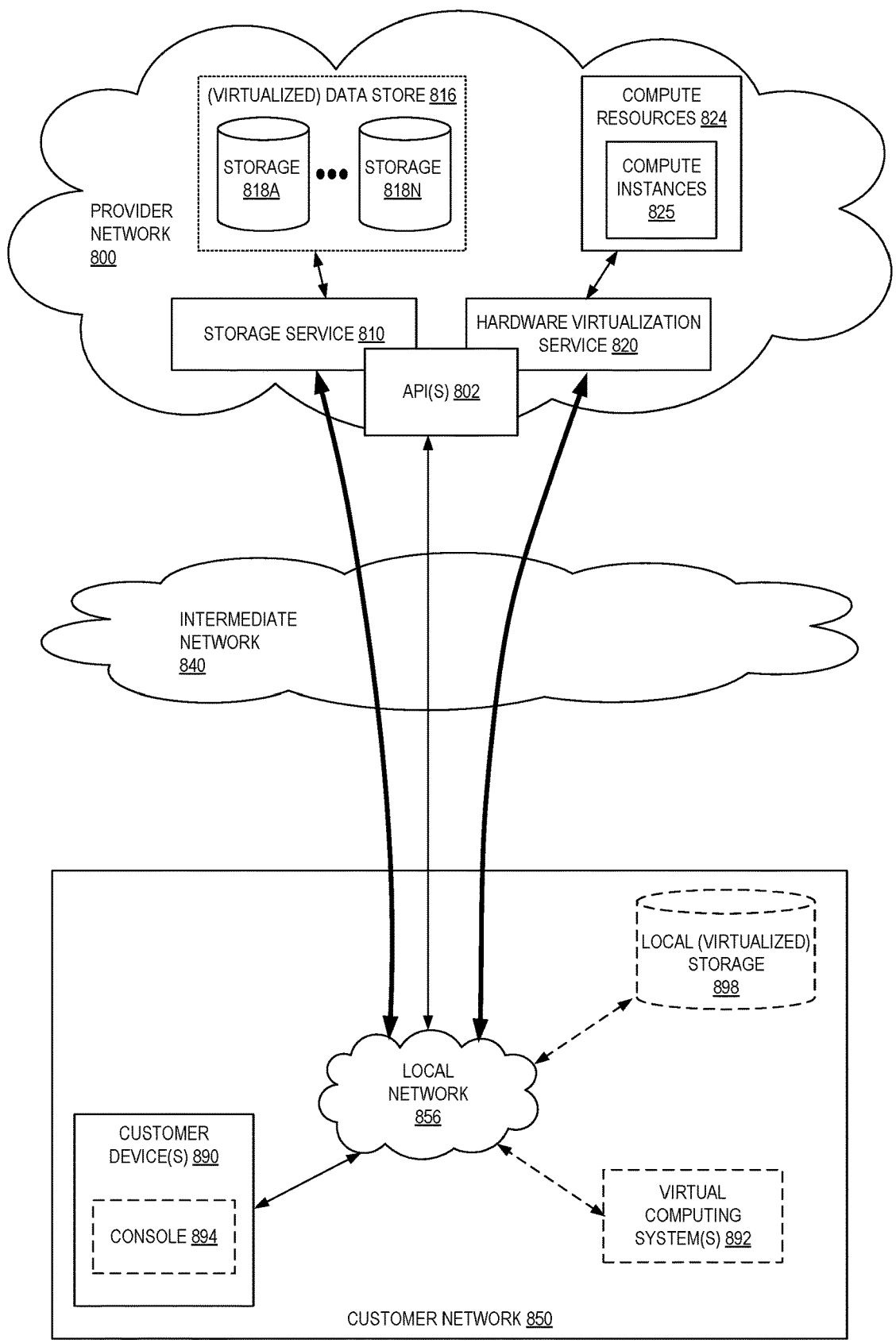
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
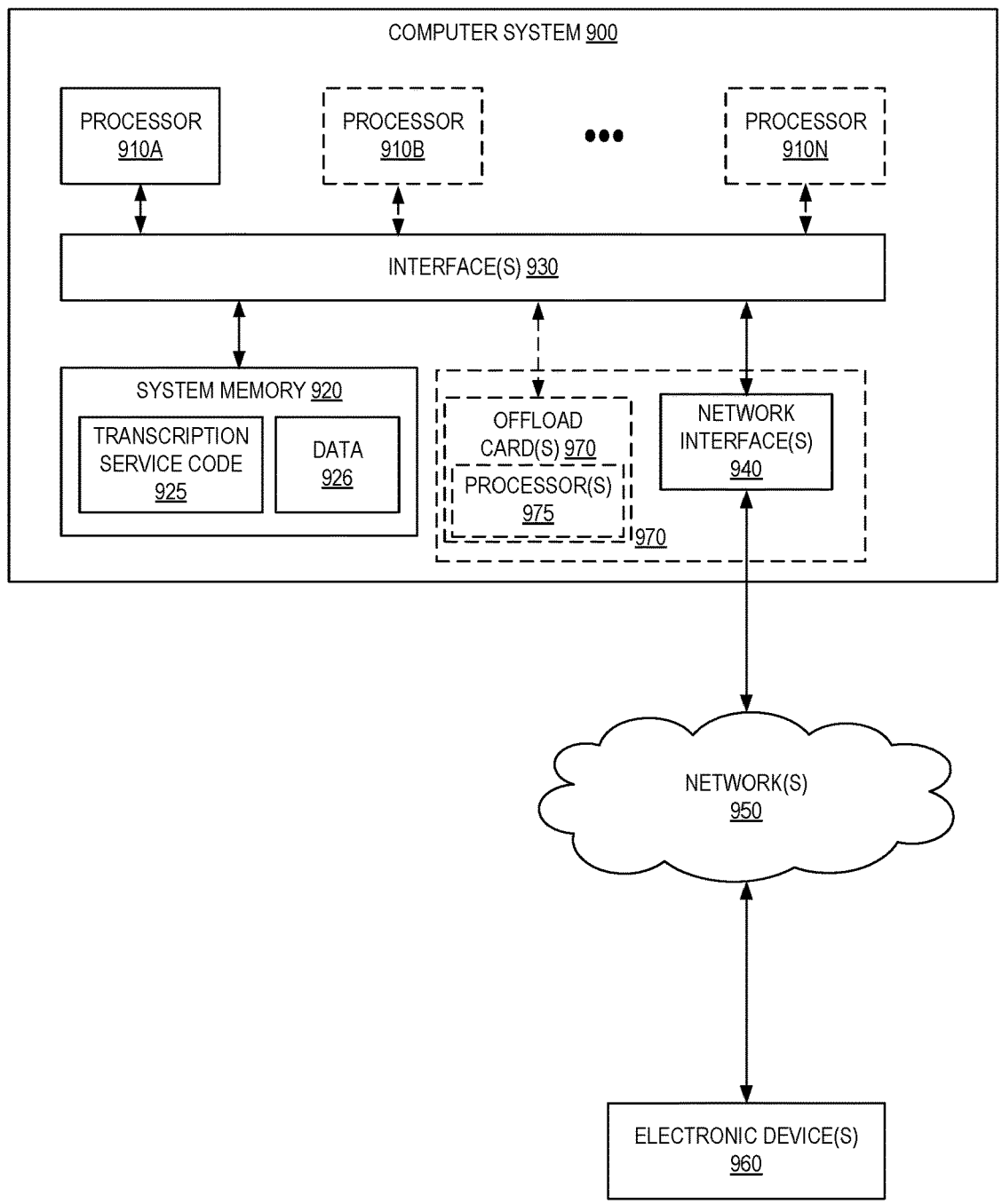
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as transcription service code 925 (e.g., executable to implement, in whole or in part, the transcription service 108) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to predict punctuation and casing for text generated from an audio file;
performing automatic speech recognition on the audio file to generate the text to punctuate and case;
processing the generated text by:
tokenizing the generated text into sub-words, and
generating a sequence of lexical features for the sub-words using a pre-trained lexical encoder;
processing audio of the audio file by:
generating a sequence of frame level acoustic embeddings using a pre-trained acoustic encoder on the audio file,
generating task specific embeddings from the frame level acoustic embeddings by applying a convolutional layer to the frame level acoustic embeddings using a pre-trained acoustic encoder and then applying a long short-term memory (LSTM) layer to an output of the convolutional layer, and
aligning the task specific embeddings to the sequence of lexical features using one of forced alignment fusion and attention-based fusion, the aligned task specific embeddings forming an aligned acoustic sequence; and
performing multimodal fusion of sub-word level acoustic embeddings and the sequence of lexical features by concatenating the sequence of lexical features and aligned acoustic sequence;
predicting punctuation and casing from the concatenated sequence of lexical features and aligned acoustic sequence;
concatenating the sub-words of the text, and applying the predicted punctuation and casing; and
outputting text having the predicted punctuation and casing.

2. The computer-implemented method of claim 1, wherein forced alignment fusion uses cumulative word durations provided by the pre-trained acoustic encoder to choose word-level features from the LSTM layer.

3. The computer-implemented method of claim 1, wherein attention-based fusion uses scaled dot-product attention to find an alignment between the task specific embeddings and the sequence of lexical features.

4. A computer-implemented method comprising:
receiving a request to predict punctuation and casing for text generated from audio;
processing the generated text by:
tokenizing the generated text into sub-words, and
generating a sequence of lexical features for the sub-words using a pre-trained lexical encoder;
processing the audio by:
generating a sequence of frame level acoustic embeddings using a pre-trained acoustic encoder on the audio,
generating task specific embeddings from the frame level acoustic embeddings, and
aligning the task specific embeddings to the sequence of lexical features;
performing multimodal fusion of sub-word level acoustic embeddings and the sequence of lexical features by combining the sequence of lexical features and aligned acoustic sequence;
predicting punctuation and casing from the combined sequence of lexical features and aligned acoustic sequence;
concatenating the sub-words of the text, and applying the predicted punctuation and casing; and
outputting text having the predicted punctuation and casing.

5. The computer-implemented method of claim 4, wherein aligning the task specific embeddings to the sequence of lexical features comprises performing forced alignment fusion that uses cumulative word durations provided by the pre-trained acoustic encoder to choose word-level features from a LSTM layer and replicate to the sub-words.

6. The computer-implemented method of claim 4, wherein aligning the task specific embeddings to the sequence of lexical features comprises performing attention-based fusion that uses scaled dot-product attention to find an alignment between the task specific embeddings and the sequence of lexical features.

7. The computer-implemented method of claim 6, wherein the scaled dot-product attention is transformer-based.

8. The computer-implemented method of claim 4, wherein the pre-trained lexical encoder is bidirectional encoder representations for transformers-based.

9. The computer-implemented method of claim 4, wherein predicting punctuation from the combined sequence of lexical features and aligned acoustic sequence comprises applying a linear layer with softmax activation to the combined sequence of lexical features and aligned acoustic sequence.

10. The computer-implemented method of claim 4, wherein the request at least includes an indication of a location of the audio, an indication of a language of the generated text, an indication of a sampling frequency of the audio, and an indication of a format of the audio.

11. The computer-implemented method of claim 4, further comprising:
concatenating the sequence of frame level acoustic embeddings with prosodic features prior to generating task specific embeddings from the frame level acoustic embeddings.

12. The computer-implemented method of claim 4, wherein the pre-trained acoustic encoder and the pre-trained lexical encoder are trained on unlabeled data.

13. The computer-implemented method of claim 4, wherein generating task specific embeddings from the frame level acoustic embeddings comprises:
applying a convolutional layer to the frame level acoustic embeddings using a pre-trained acoustic encoder and then applying a long short-term memory (LSTM) layer to an output of the convolutional layer.

14. The computer-implemented method of claim 4, further comprising:
generating the text by performing automated speech recognition.

15. A system comprising:
a first one or more electronic devices to provide audio to a multi-tenant provider network; and
a second one or more electronic devices to implement a transcription service in the multi-tenant provider network, the transcription service including instructions that upon execution cause the transcription service to:
receive a request to predict punctuation and casing for text generated from the provided audio;
process the generated text to:
tokenize the generated text into sub-words, and
generate a sequence of lexical features for the sub-words using a pre-trained lexical encoder;
process the audio to:
generate a sequence of frame level acoustic embeddings using a pre-trained acoustic encoder on the audio,
generate task specific embeddings from the frame level acoustic embeddings, and
align the task specific embeddings to the sequence of lexical features;
perform multimodal fusion of sub-word level acoustic embeddings and the sequence of lexical features to combine the sequence of lexical features and aligned acoustic sequence;
predict punctuation and casing from the combined sequence of lexical features and aligned acoustic sequence;
concatenate the sub-words of the text, and applying the predicted punctuation and casing; and
output text having the predicted punctuation and casing.

16. The system of claim 15, wherein aligning the task specific embeddings to the sequence of lexical features comprises performing forced alignment fusion that uses cumulative word durations provided by the pre-trained acoustic encoder to choose word-level features from a LSTM layer and replicate to the sub-words.

17. The system of claim 15, wherein aligning the task specific embeddings to the sequence of lexical features comprises performing attention-based fusion that uses scaled dot-product attention to find an alignment between the task specific embeddings and the sequence of lexical features.

18. The system of claim 17, wherein the scaled dot-product attention is transformer-based.

19. The system of claim 15, wherein predicting punctuation from the combined sequence of lexical features and aligned acoustic sequence comprises applying a linear layer with softmax activation to the combined sequence of lexical features and aligned acoustic sequence.

20. The system of claim 15, wherein the request at least includes an indication of a location of the audio, an indication of a language of the generated text, an indication of a sampling frequency of the audio, and an indication of a format of the audio.

\* \* \* \* \*